(12) United States Patent
Faller

(10) Patent No.: US 10,625,724 B2
(45) Date of Patent: Apr. 21, 2020

(54) MODULAR-SYSTEM-OPTIMIZED PNEUMATIC BRAKE BOOSTER

(71) Applicant: Continental Teves AG & Co. oHG, Frankfurt am Main (DE)

(72) Inventor: Jürgen Faller, Kahl (DE)

(73) Assignee: Continental Teves AG & Co. oHG, Frankfurt am Main (DE)

( * ) Notice: Subject to any disclaimer, the term of this patent is extended or adjusted under 35 U.S.C. 154(b) by 0 days.

(21) Appl. No.: 16/464,763

(22) PCT Filed: Nov. 17, 2017

(86) PCT No.: PCT/EP2017/079609
§ 371 (c)(1),
(2) Date: May 29, 2019

(87) PCT Pub. No.: WO2018/108450
PCT Pub. Date: Jun. 21, 2018

(65) Prior Publication Data
US 2019/0389445 A1 Dec. 26, 2019

(30) Foreign Application Priority Data
Dec. 12, 2016 (DE) .......................... 10 2016 224 715

(51) Int. Cl.
*B60T 13/57* (2006.01)
*B60T 13/567* (2006.01)
(52) U.S. Cl.
CPC ............ *B60T 13/57* (2013.01); *B60T 13/567* (2013.01)
(58) Field of Classification Search
CPC ... B60T 13/565; B60T 13/567; B60T 13/5675
See application file for complete search history.

(56) References Cited

U.S. PATENT DOCUMENTS

| 2,820,345 A | * | 1/1958 | Stelzer | B60T 13/565 60/550 |
| 3,030,127 A | * | 4/1962 | Stelzer | B60T 13/567 285/91 |

(Continued)

FOREIGN PATENT DOCUMENTS

| CN | 105438156 A | 3/2016 |
| DE | 10218762 A1 | 10/2002 |

(Continued)

OTHER PUBLICATIONS

German Search Report for German Application No. 10 2016 224 715.8, with partial translation, dated Oct. 26, 2017—8 pages.

(Continued)

*Primary Examiner* — Thomas E Lazo
*Assistant Examiner* — Matthew Wiblin
(74) *Attorney, Agent, or Firm* — RatnerPrestia

(57) ABSTRACT

A pneumatic brake booster having a vacuum chamber and a working chamber in a booster housing separated from one another by an elastic diaphragm. The diaphragm bears in regions against a diaphragm plate axially displaceable between a zero position and a maximum stroke. An axial spacing between the zero position and the maximum stroke defines a stroke range of the brake booster. The diaphragm has a rolling fold which, during the displacement of the diaphragm plate, rolls on a rolling region on an inner wall of the booster housing. In order to offer a solution in which it is the intention for a modular system for different stroke ranges to be formed more efficiently and for the efficiency loss to be minimized or avoided, the booster housing has, in the rolling region, a tapered, conical portion with a cone angle $\geq 8°$ and an axial extent $>\frac{1}{3}*$stroke range.

9 Claims, 2 Drawing Sheets

(56) References Cited

U.S. PATENT DOCUMENTS

| | | | |
|---|---|---|---|
| 3,109,346 A | 11/1963 | Julow | |
| 3,113,806 A * | 12/1963 | Cripe | B60T 13/245 |
| | | | 384/16 |
| 3,257,811 A * | 6/1966 | Aiki | B60T 13/565 |
| | | | 60/555 |
| 3,893,379 A * | 7/1975 | Cripe | B60T 13/565 |
| | | | 92/94 |
| 4,007,664 A * | 2/1977 | Popp | B60T 8/38 |
| | | | 91/49 |
| 4,596,178 A * | 6/1986 | Sugiura | B60T 13/567 |
| | | | 220/293 |
| 5,305,606 A * | 4/1994 | Schonlau | B60T 8/4854 |
| | | | 60/547.1 |
| 6,189,437 B1 * | 2/2001 | Morlan | B60T 13/5675 |
| | | | 92/165 PR |
| 6,637,838 B2 | 10/2003 | Watanabe | |
| 6,883,415 B2 | 4/2005 | Kawasumi et al. | |
| 2002/0158508 A1 * | 10/2002 | Watanabe | B60T 13/567 |
| | | | 303/114.3 |

FOREIGN PATENT DOCUMENTS

| | | |
|---|---|---|
| DE | 10260190 A1 | 7/2003 |
| DE | 102012208866 A1 | 11/2012 |

OTHER PUBLICATIONS

International Search Report and Written Opinion for International Application No. PCT/EP2017/079609, dated Feb. 28, 2018—7 pages.

English Translation of the Written Opinion for International Application No. PCT/EP2017/079609, dated Feb. 28, 2018—7 pages.

* cited by examiner

MODULAR-SYSTEM-OPTIMIZED PNEUMATIC BRAKE BOOSTER

CROSS REFERENCE TO RELATED APPLICATIONS

This application is the U.S. National Phase Application of PCT International Application No. PCT/EP2017/079609, filed Nov. 17, 2017, which claims priority to German Patent Application No. 10 2016 224 715.8, filed Dec. 12, 2016, the contents of such applications being incorporated by reference herein.

FIELD OF THE INVENTION

The invention relates to a pneumatic brake booster in particular for a hydraulic motor vehicle brake system.

BACKGROUND OF THE INVENTION

Brake boosters of this type are widely used and known. The booster housing of a brake booster of said type normally has at least two thin-walled housing shells which are connected to one another or fixed or coupled to one another. Here, in the booster housing, at least one negative-pressure chamber is pneumatically separated from a working chamber by a diaphragm composed of elastomer material. Here, the diaphragm lies in regions on a rigid diaphragm plate, which, during operation, is axially movable over a structurally defined stroke range.

To compensate for the axial movement, the diaphragm has a rolling fold, which is arranged radially at the outside, between the diaphragm plate and the inner wall of the booster housing and which, during operation, rolls on a rolling region on the inner wall of the booster housing.

The projected area of support of the diaphragm on the diaphragm plate functions as a pneumatically effective area for the build-up of the boost force and significantly influences the efficiency of the brake booster. It is therefore sought to minimize the radial spacing between the diaphragm plate and the booster housing over the entire stroke range, and therefore, the booster housing of the known pneumatic brake booster is, in the rolling region, cylindrical or formed with a minimal, production-related demolding taper, usually in a range between 1° to 2°.

Brake boosters with different stroke ranges are required for different vehicle applications. For the purpose of cost savings, it is sought to realize this on the basis of a modular system by virtue of only a few components having to be changed or exchanged, for example an axially deeper housing shell for a larger stroke range and vice versa. In this method, in the case of the known brake boosters, the diaphragm must also be changed or provided in several versions.

For example, the rolling fold of a diaphragm designed for a long-stroke brake booster would form a large bladder in the case of small-stroke brake boosters even at the maximum strokes thereof, thereby unfavorably reducing the volume of the vacuum chamber and increasing that of the working chamber. However, this reduces the efficiency and the magnitude of the achievable boost force, and degrades the response behavior.

In the case of a diaphragm designed for a small-stroke brake booster being used in long-stroke brake boosters, the diaphragm would, at maximum stroke, no longer lie fully against the diaphragm plate, lift off from the latter, thereby reduce the pneumatically effective area, and consequently likewise reduce the efficiency and the magnitude of the achievable boost force.

SUMMARY OF THE INVENTION

An aspect of the invention offers a solution in which it is the intention for a modular system for different stroke ranges to be formed more efficiently and for the efficiency loss to be minimized or avoided.

In particular, an aspect of the invention provides that the booster housing has, in the rolling region, a tapered, in particular conical portion with a cone angle greater than 8° and an axial extent greater than one third of the respective stroke range.

In one refinement of an aspect of the invention, the cone angle of the corresponding portion of the booster housing in the rolling region is provided in a range between 8° and 10° and preferably in a range between 8.5° and 9°.

The length of the rolling fold in the case of small-stroke embodiments of the brake booster can thereby be selected to be smaller, as result of which, a smaller region has to be deformed during the stroke, and the flexing work and the associated losses are reduced. In this way, a single standardized embodiment of a diaphragm can be used for all stroke ranges within a modular system. The variety of parts of the rolling diaphragm is reduced, and thus also the part price.

The degree of deformation of the metal sheet during the production of a housing shell is reduced in relation to a cylindrical design, and the production costs are reduced.

Furthermore, the housing shells are made more easily stackable, whereby the space required for transport is reduced, or greater wall thicknesses are made possible. This reduces the logistics costs.

One refinement of an aspect of the invention provides that a radial spacing between the diaphragm plate and the rolling region at maximum stroke is at least a sum of twice the thickness of the diaphragm in the region of the rolling fold with a specific minimum allowable flexing radius of the diaphragm.

Damage to the membrane is thereby prevented and at the same time the efficiency loss is reduced.

According to one preferred embodiment of an aspect of the invention, a radial spacing between the diaphragm plate and the rolling region at zero position is at least twice the radial spacing at maximum stroke. The losses owing to the flexing work in the rolling fold and the efficiency loss are thus further optimized.

According to one advantageous embodiment of an aspect of the invention, the booster housing has at least one first housing shell and at least one second housing shell and, between the housing shells, an annular gap which extends forward in an axial direction and in which a region of the diaphragm is arranged.

In one particularly preferred refinement of an aspect of the invention, the annular gap is designed such that its axial extent is at least twice its radial gap dimension. As a result, the guidance of the rolling fold is improved, damage at the transition thereof to the sealing bead is avoided, and the sealing bead is prevented in an effective manner from slipping out or disengaging into the interior of the booster housing.

For optimized material utilization and a saving of costs and weight, a preferred embodiment of an aspect of the invention provides that the conical portion extends substantially to the annular gap.

BRIEF DESCRIPTION OF THE DRAWINGS

The details and advantages of aspects of the invention will be explained in more detail hereunder by means of descriptions of the figures. In this context, the description of generally known aspects and functions of a brake booster of the generic type will be largely omitted, and only the details which are relevant to aspects of the invention will be discussed.

In detail.

DETAILED DESCRIPTION OF THE PREFERRED EMBODIMENTS

FIG. 1

Figure 1:
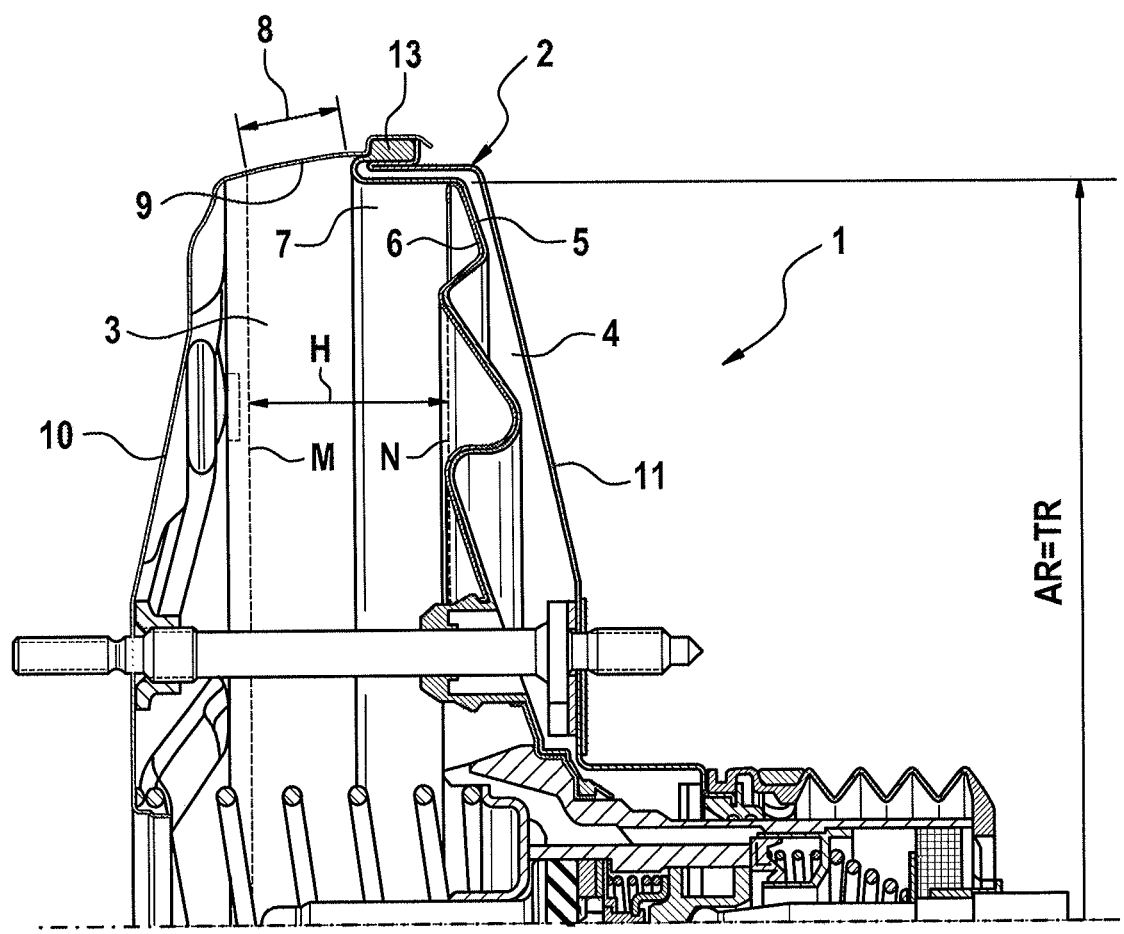
FIG. 1 shows, by way of example, an axial sectional illustration of an embodiment of the brake booster according to an aspect of the invention.
Figure 2:
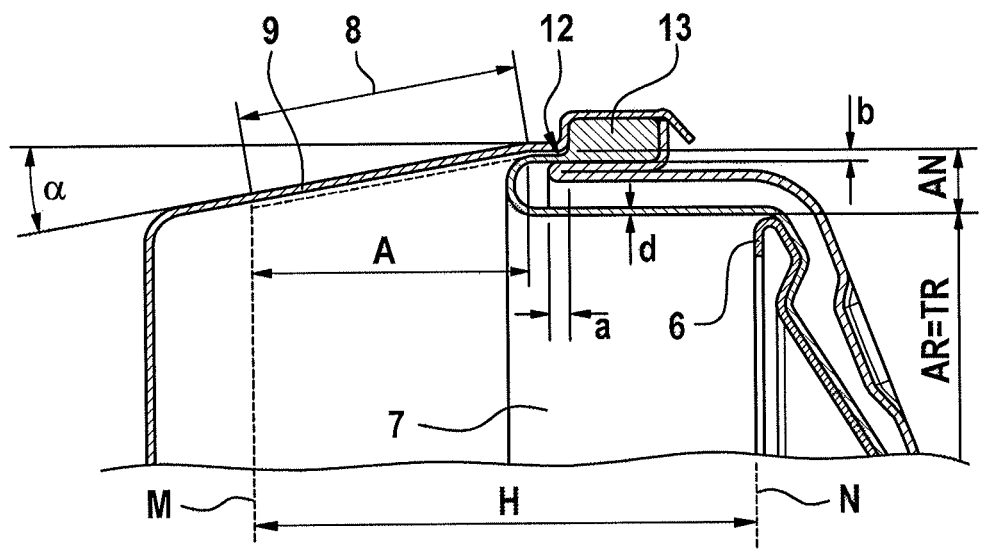
FIG. 2 shows an enlarged illustration of the embodiment of FIG. 1 in the region of the rolling fold with the diaphragm plate in the zero position.
Figure 3:
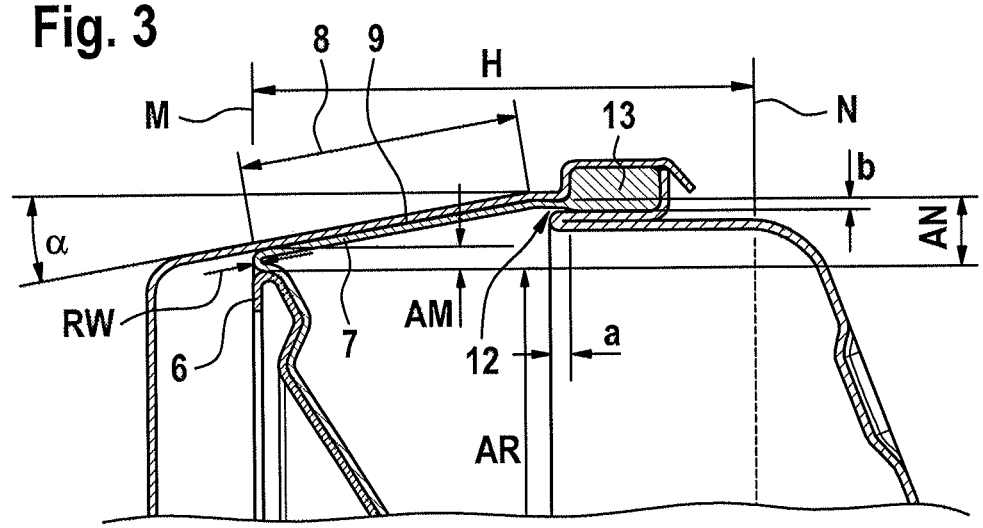
FIG. 3 shows an enlarged illustration of the embodiment of FIG. 1 in the region of the rolling fold with the diaphragm plate at maximum stroke.

A pneumatic brake booster 1 is of substantially rotationally symmetrical construction. It has a thin-walled booster housing 2. The booster housing 2 comprises housing shells 10 and 11, which are connected to one another in their radial outer region, and includes a vacuum chamber 3 and a working chamber 4, which are pneumatically separated from one another by an elastomeric diaphragm 5.

The boost force is generated in the pneumatic brake booster 1 by a pressure difference between the vacuum chamber 3 and the working chamber 4 and is introduced into a rigid diaphragm plate 6, which is thereupon moved axially in the booster housing 2 within a structurally provided stroke range H between a zero position N and a maximum stroke M and transmits the boost force to components positioned downstream in terms of action.

Here, the diaphragm 5 is supported in the direction of the vacuum chamber 3 against the diaphragm plate 6, wherein the pneumatically effective area is definable by a projected support area of the diaphragm 5 on the diaphragm plate 6 and thus by the support radius AR. For maximum efficiency, the support radius AR should ideally be equal to the outer radius TR of the diaphragm plate 6 in every operating state and at every stroke position.

To compensate for the movement of the diaphragm 5, the latter has a roll fold 7 which, during the displacement of the diaphragm plate 6 between the zero position N and the maximum stroke M, rolls on a rolling region 8 on the inner wall of the booster housing 2.

At the radial outer edge of the diaphragm 5, there is integrally formed a circumferential sealing bead 13 which is clamped between the housing shells 10 and 11 in a separately formed annular cavity in pneumatically sealed fashion.

FIG. 2

The booster housing 2 according to an aspect of the invention has, in the rolling region 8, a conical portion 9 whose axial extent A is at least one third and preferably half of the stroke range H and whose cone angle α lies in a range between 8° and 10°, preferably between 8.5° and 9° and is ideally 8.8°.

FIG. 3

To ensure a permanent function with optimized efficiency and reduced material expenditure, the components of the brake booster 1 according to an aspect of the invention are designed such that a radial spacing AM between the diaphragm plate 6 and the rolling region 8 on the booster housing 2 at maximum stroke M seeks to assume a value which is the sum of twice the thickness d of the diaphragm 5 in the region of the rolling fold 7 and a specific minimum admissible flexing radius RW of the diaphragm 5, but does not fall below this. AM≥2d+RW; AM→2d+RW applies.

Here, the flexing radius RW is a minimum admissible bending radius of the diaphragm 5 in the case of which, taking into consideration the specific material properties and the thickness d, cracking owing to stress-induced overloading in the boundary layers is avoided over the entire intended operating duration of the brake booster 1. For example, for a diaphragm 5 made of EPDM material with a thickness d≈1 mm, the flexing radius RW≈1.5 mm is preferably defined.

The requirements for the minimum admissible radial spacing AM at maximum stroke M imperatively apply for the structural design of the long-stroke embodiment. In the case of a short-stroke embodiment, it is for example possible within an aspect of the invention for the cone angle a to be increased in relation to the long-stroke design in order to permit the same radial spacing AM, or the cone angle a may remain the same, whereby the radial spacing AM is slightly increased.

The stroke range H for a long-stroke embodiment of the brake booster 1 according to an aspect of the invention could for example lie in a range between 40 mm and 50 mm and preferably be 46 mm.

For a short-stroke embodiment of the brake booster 1 according to an aspect of the invention, the stroke range H could for example lie in a range between 30 mm and 40 mm and preferably be 36 mm. A resulting stroke difference between the short-stroke and long-stroke embodiments of 10 to 20 mm can be easily realized without efficiency loss with a single standardized embodiment of the diaphragm 5.

The booster housing 2 of the illustrated embodiment of the brake booster 1 according to an aspect of the invention is designed such that the radial spacing AN between the diaphragm plate 6 and the rolling region 8 at zero position N is approximately and at least twice the radial spacing AM at maximum stroke M. Taking into consideration the design principles for the spacing AN as disclosed above, the losses owing to the flexing work in the rolling fold 7 and the extent of the bladder formation thereof can thus be brought into an optimum relationship, and the efficiency loss can thus be minimized.

In order to improve the guidance of the rolling fold 7, avoid damage at the transition thereof to the sealing bead 13 and prevent the sealing bead 13 from slipping out or disengaging into the interior space of the booster housing 2, the two housing shells 10 and 11 are formed such that an axially forwardly extending annular gap 12 is formed in between. Here, the diaphragm 5 or the rolling fold 7 runs through the annular gap 12.

Here, the radial gap dimension b of the annular gap 12 is configured to be substantially smaller than the thickness of the sealing bead 13 and only insignificantly wider than the thickness d of the membrane 5. Here, the axial extent a of the annular gap 12 should be configured to be at least equal to and preferably at least twice the radial gap dimension b thereof.

In the illustrated preferred embodiment of the brake booster 1 according to an aspect of the invention, the conical portion 9 extends directly to the annular gap 12.

LIST OF REFERENCE DESIGNATIONS

1 Brake booster
2 Booster housing

3 Vacuum chamber
4 Working chamber
5 Diaphragm
6 Diaphragm plate
7 Rolling fold
8 Rolling region
9 Conical portion
10 Housing shell
11 Housing shell
12 Annular gap
13 Sealing bead
a Cone angle
a Axial extent
A Axial extent
b Radial gap dimension
d Thickness of the diaphragm
H Stroke range
M Maximum stroke
N Zero position
AM Radial spacing at maximum stroke
AN Radial spacing at zero position
AR Support radius
RW Specific minimum admissible flexing radius
TR Diaphragm plate radius

The invention claimed is:

1. A pneumatic brake booster having a booster housing, having at least one vacuum chamber and at least one working chamber which are provided in the booster housing and which are pneumatically separated from one another by an elastic diaphragm, wherein the diaphragm bears in regions against a substantially circular diaphragm plate which is axially displaceable in the booster housing between a zero position and a maximum stroke, wherein an axial spacing between the zero position and the maximum stroke defines a stroke range of the brake booster, wherein the diaphragm has a rolling fold which, during the displacement of the diaphragm plate, rolls on a rolling region on an inner wall of the booster housing, wherein the booster housing has, in the rolling region, a tapered, conical portion with a cone angle $\geq 8°$ and an axial extent $>\frac{1}{3}*$stroke range.

2. The brake booster as claimed in claim 1, wherein a radial spacing (AM) between the diaphragm plate and the rolling region at the maximum stroke is at least a sum of twice a thickness (d) of the diaphragm in the region of the rolling fold with a specific minimum allowable flexing radius (RW) of the diaphragm; $AM \geq 2d+RW$.

3. The brake booster as claimed in claim 2, wherein a radial spacing (AN) between the diaphragm plate and the rolling region at the zero position is at least twice the radial spacing at maximum stroke; $AN \geq 2*AM$.

4. The brake booster as claimed in claim 1, wherein the cone angle is provided in a range between 8° and 10°.

5. The brake booster as claimed in claim 4, wherein the cone angle is provided in a range between 8.5° and 9°.

6. The brake booster as claimed in claim 1, wherein the booster housing has at least one first housing shell and at least one second housing shell and, between the housing shells, there is formed an annular gap which extends forward in an axial direction and in which a region of the diaphragm is arranged.

7. The brake booster as claimed in claim 6, wherein an axial extent of the annular gap is at least of the same size as its radial gap dimension.

8. The brake booster as claimed in claim 7, wherein the axial extent of the annular gap is at least twice its radial gap dimension.

9. The brake booster as claimed in claim 8, wherein the conical portion extends substantially to the annular gap.

* * * * *